(12) United States Patent
Strutt (10) Patent No.: US 11,976,597 B2
(45) Date of Patent: May 7, 2024

(54) LOW-FREQUENCY ACOUSTIC CENTER BODY

(71) Applicant: ROHR, INC., Chula Vista, CA (US)

(72) Inventor: Andrew John Strutt, San Diego, CA (US)

(73) Assignee: ROHR, INC., Chula Vista, CA (US)

(*) Notice: Subject to any disclaimer, the term of this patent is extended or adjusted under 35 U.S.C. 154(b) by 193 days.

(21) Appl. No.: 17/473,715

(22) Filed: Sep. 13, 2021

(65) Prior Publication Data
US 2023/0085562 A1    Mar. 16, 2023

(51) Int. Cl.
*F02C 7/24* (2006.01)
*F02K 1/04* (2006.01)
*F02K 1/82* (2006.01)
*G10K 11/162* (2006.01)
*G10K 11/172* (2006.01)

(52) U.S. Cl.
CPC .............. *F02C 7/24* (2013.01); *F02K 1/04* (2013.01); *F02K 1/827* (2013.01); *G10K 11/162* (2013.01); *G10K 11/172* (2013.01); *F05D 2220/32* (2013.01); *F05D 2260/96* (2013.01)

(58) Field of Classification Search
CPC ... B64D 2033/0206; F02K 1/827; F02K 1/04; F02C 7/045; F02C 7/24; G10K 11/162; G10K 11/172; F05D 2260/96; F05D 2260/963
See application file for complete search history.

(56) References Cited

U.S. PATENT DOCUMENTS

| | | | | |
|---|---|---|---|---|
| 4,064,961 A | * | 12/1977 | Tseo | .................... G10K 11/172 |
| | | | | 181/213 |
| 4,137,992 A | * | 2/1979 | Herman | .................. F02K 1/827 |
| | | | | 181/269 |
| 4,240,519 A | | 12/1980 | Wynosky | |

(Continued)

FOREIGN PATENT DOCUMENTS

| | | | |
|---|---|---|---|
| EP | 4083409 | | 11/2022 |
| FR | 3117257 A1 | * | 6/2022 |

(Continued)

OTHER PUBLICATIONS

European Patent Office, European Search Report dated Feb. 10, 2023 in Application No. 22195293.0.

*Primary Examiner* — Jeremy A Luks
(74) *Attorney, Agent, or Firm* — SNELL & WILMER L.L.P.

(57) ABSTRACT

A center plug for attenuating noise in a gas turbine engine includes an inner skin, the inner skin having a substantially cylindrical shape and extending along an axial centerline; an outer skin positioned radially outside the inner skin; a forward bulkhead disposed proximate a forward end of the inner skin, the forward bulkhead connected to and extending radially outward from the inner skin; an aft bulkhead disposed proximate an aft end of the inner skin, the aft bulkhead connected to and extending radially outward from the inner skin; and a first resonator cavity disposed within a volume defined by the inner skin, the outer skin and the forward bulkhead and the aft bulkhead, the first resonator cavity including a first perforated disk extending between the inner skin and the outer skin and forming a first sub-cavity and a second sub-cavity.

17 Claims, 5 Drawing Sheets

(56) References Cited

U.S. PATENT DOCUMENTS

| | | | |
|---|---|---|---|
| 4,944,362 A | 7/1990 | Motsinger et al. | |
| 7,784,283 B2* | 8/2010 | Yu | F02K 1/04 |
| | | | 60/770 |
| 8,025,122 B2* | 9/2011 | Gilcreest | F01N 1/083 |
| | | | 60/770 |
| 8,307,945 B2* | 11/2012 | Todorovic | F02K 1/827 |
| | | | 60/770 |
| 8,479,877 B2* | 7/2013 | Todorovic | F02K 1/04 |
| | | | 244/1 N |
| 9,051,899 B2 | 6/2015 | Malot et al. | |
| 9,062,610 B2 | 6/2015 | Morvant | |
| 9,261,008 B2 | 2/2016 | Mecuson et al. | |
| 9,592,918 B2* | 3/2017 | Yu | B64D 33/06 |
| 9,708,930 B2* | 7/2017 | Koroly | F01D 25/04 |
| 9,761,216 B2* | 9/2017 | Nampy | G10K 11/175 |
| 11,428,191 B1* | 8/2022 | Alonso-Miralles | F02K 1/80 |
| 2004/0076512 A1* | 4/2004 | Lata Perez | F02C 7/24 |
| | | | 415/119 |
| 2007/0256889 A1 | 11/2007 | Yu et al. | |
| 2013/0306403 A1 | 11/2013 | Todorovic | |
| 2019/0054999 A1* | 2/2019 | Narayanan Nampy | B64D 29/00 |
| 2020/0088135 A1 | 3/2020 | Lopez et al. | |
| 2020/0193953 A1* | 6/2020 | Gurvich | G10K 11/172 |
| 2021/0215122 A1* | 7/2021 | Brochard | F01N 1/023 |
| 2022/0389838 A1* | 12/2022 | Sanz Martinez | B64D 33/06 |
| 2023/0079348 A1* | 3/2023 | Alonso-Miralles | G10K 11/172 |
| | | | 181/284 |

FOREIGN PATENT DOCUMENTS

| | | |
|---|---|---|
| JP | S5591744 | 7/1980 |
| WO | 2013121155 | 8/2013 |

* cited by examiner

LOW-FREQUENCY ACOUSTIC CENTER BODY

FIELD

The present disclosure relates generally to an aircraft gas turbine engine exhaust system and, more particularly, to an exhaust nozzle and a center body configured to attenuate low-frequency exhaust noise generated by an engine combustor.

BACKGROUND

The engines of an aircraft propelled by gas turbine engines produce varying amounts of audible noise during all stages of operation, including during takeoff and landing. For example, a gas turbine engine typically operates at or near maximum thrust as the aircraft departs from an airport, generating large amounts of engine noise, and at a lower thrust as the aircraft approaches an airport. Some aircraft engine noise can be partially suppressed at the engine nacelle inlet and the exhaust nozzle and center body by noise absorbing structures. These structures can absorb acoustic energy by canceling reflected acoustic waves or by converting acoustic energy into heat. The structures typically consist of a porous skin and three or more non-perforated walls to form one or more chambers. The porous skin and the non-perforated walls of such chambers combine to form a plurality of Helmholtz resonators that resonate in response to certain sound frequencies or certain bands of frequencies and cancel sound waves reflected between the porous face skin and non-perforated walls or subsequently convert the sound energy into heat (via elastic or mechanical hysteresis caused by the resonant response of air within the resonator cavities and of the liner components), and thereby effectively absorb or dissipate at least a portion of generated engine noise.

In general, relatively thin acoustic panels may be utilized to attenuate noise with relatively short wavelengths and high frequencies, whereas relatively thick acoustic panels may be utilized to attenuate noise with relatively long wavelengths and low frequencies. However, as noise wavelengths become longer as a byproduct of new engine designs while space allocation for noise attenuation structures decreases, traditional acoustic panel configurations may not attenuate noise to acceptable levels, which are often mandated by government regulations. To achieve further reductions in the noise levels of gas turbine engines used on modern aircraft, especially during aircraft takeoffs and approaches, it is desirable to dissipate some of the long-wavelength and low-frequency noise generated by the combustor and the exhaust system of a gas turbine engine, particularly where the combustor and exhaust noise has one or more frequencies less than about 1,000 Hz.

SUMMARY

A center plug for attenuating noise in a gas turbine engine is disclosed. In various embodiments, the center plug includes an inner skin, the inner skin having a substantially cylindrical shape and extending along an axial centerline; an outer skin positioned radially outside the inner skin; a forward bulkhead disposed proximate a forward end of the inner skin, the forward bulkhead connected to and extending radially outward from the inner skin; an aft bulkhead disposed proximate an aft end of the inner skin, the aft bulkhead connected to and extending radially outward from the inner skin; and a first resonator cavity disposed within a volume defined by the inner skin, the outer skin and the forward bulkhead and the aft bulkhead, the first resonator cavity including a first perforated disk extending between the inner skin and the outer skin and forming a first sub-cavity and a second sub-cavity.

In various embodiments, the outer skin is connected to and positioned radially outward of the forward bulkhead, the aft bulkhead and the first perforated disk. In various embodiments, the outer skin includes a first plurality of perforations extending into the first sub-cavity. In various embodiments, a first intermediate bulkhead is disposed aft of the first perforated disk and extending between the inner skin and the outer skin. In various embodiments, the first resonator cavity is configured to attenuate noise having frequencies within a range extending from about 200 Hz to about 1,000 Hz.

In various embodiments, the first intermediate bulkhead is oriented at an angle with respect to the axial centerline. In various embodiments, the angle is within a first range from about forty degrees to about eighty degrees with respect to the axial centerline. In various embodiments, the first perforated disk is oriented within a second range from about minus ten degrees to about plus ten degrees with respect to a radial direction extending perpendicular to the axial centerline. In various embodiments, the first intermediate bulkhead is configured to form a cone extending circumferentially about the axial centerline. In various embodiments, the first perforated disk extends perpendicularly to the axial centerline.

In various embodiments, a second resonator cavity is disposed within the volume defined by the inner skin, the outer skin and the forward bulkhead and the aft bulkhead, the second resonator cavity including a second perforated disk extending between the inner skin and the outer skin and forming a third sub-cavity and a fourth sub-cavity. In various embodiments, a second intermediate bulkhead is disposed aft of the second perforated disk and extending between the inner skin and the outer skin. In various embodiments, the second intermediate bulkhead is oriented at the angle with respect to the axial centerline. In various embodiments, the second perforated disk is oriented within the second range from about minus ten degrees to about plus ten degrees with respect to the radial direction extending perpendicular to the axial centerline.

In various embodiments, a third resonator cavity is disposed within the volume defined by the inner skin, the outer skin and the forward bulkhead and the aft bulkhead, the third resonator cavity including a third perforated disk extending between the inner skin and the outer skin and forming a fifth sub-cavity and a sixth sub-cavity. In various embodiments, the second resonator cavity is bounded by the first intermediate bulkhead and the second intermediate bulkhead and the third resonator cavity is bounded by the second intermediate bulkhead and the aft bulkhead. In various embodiments, the outer skin includes a second plurality of perforations extending into the third sub-cavity and a third plurality of perforations extending into the fifth sub-cavity.

A noise attenuation system for a gas turbine engine is disclosed. In various embodiments, the noise attenuation system includes a center plug, the center plug including an inner skin, the inner skin having a substantially cylindrical shape and extending along an axial centerline, an outer skin positioned radially outside the inner skin, a forward bulkhead disposed proximate a forward end of the inner skin, the forward bulkhead connected to and extending radially outward from the inner skin, an aft bulkhead disposed proximate an aft end of the inner skin, the aft bulkhead connected to and extending radially outward from the inner skin; and a first resonator cavity disposed within a volume defined by the inner skin, the outer skin and the forward bulkhead and the aft bulkhead, the first resonator cavity including a first perforated disk extending between the inner skin and the outer skin and forming a first sub-cavity and a second sub-cavity, the first perforated disk extending perpendicularly to the axial centerline extending through the center plug.

In various embodiments, a second resonator cavity is disposed within the volume defined by the inner skin, the outer skin and the forward bulkhead and the aft bulkhead, the second resonator cavity including a second perforated disk extending between the inner skin and the outer skin and forming a third sub-cavity and a fourth sub-cavity, the second perforated disk extending perpendicularly to the axial centerline extending through the center plug. In various embodiments, the first resonator cavity and the second resonator cavity are separated by an intermediate bulkhead oriented at an angle within a range from about forty degrees to about eighty degrees with respect to the axial centerline.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
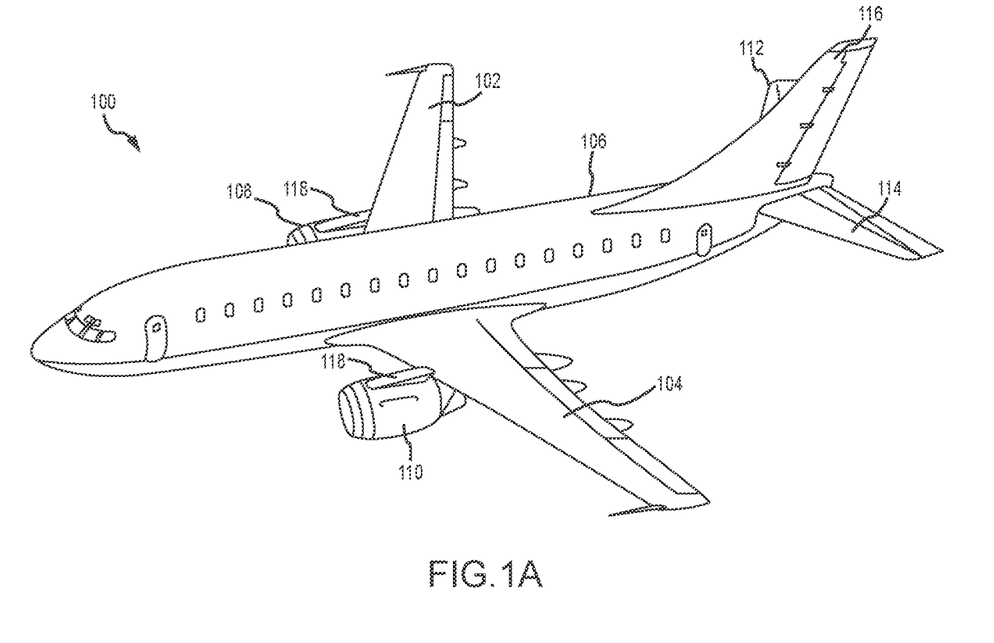
FIG. 1A is a perspective illustration of an aircraft, in accordance with various embodiments.

Referring now to the drawings, FIG. 1A illustrates an aircraft 100, in accordance with various embodiments. The aircraft 100 is an example of a passenger or transport vehicle in which noise attenuation systems may be implemented in accordance with various embodiments. In an illustrative embodiment, the aircraft 100 has a starboard wing 102 and a port wing 104 attached to a fuselage 106. The aircraft 100 also includes a starboard engine system 108 connected to the starboard wing 102 and a port engine system 110 connected to the port wing 104. In various embodiments, the aircraft 100 also includes a starboard horizontal stabilizer 112, a port horizontal stabilizer 114 and a vertical stabilizer 116. A pylon 118 is used to connect a gas turbine engine within the starboard engine system 108 to the starboard wing 102 and a gas turbine engine within the port engine system 110 to the port wing 104, though, in various embodiments, the gas turbine engines may be connected to other portions of the aircraft 100, such as, for example, to the port and starboard sides of the fuselage 106.

Figure 1B:
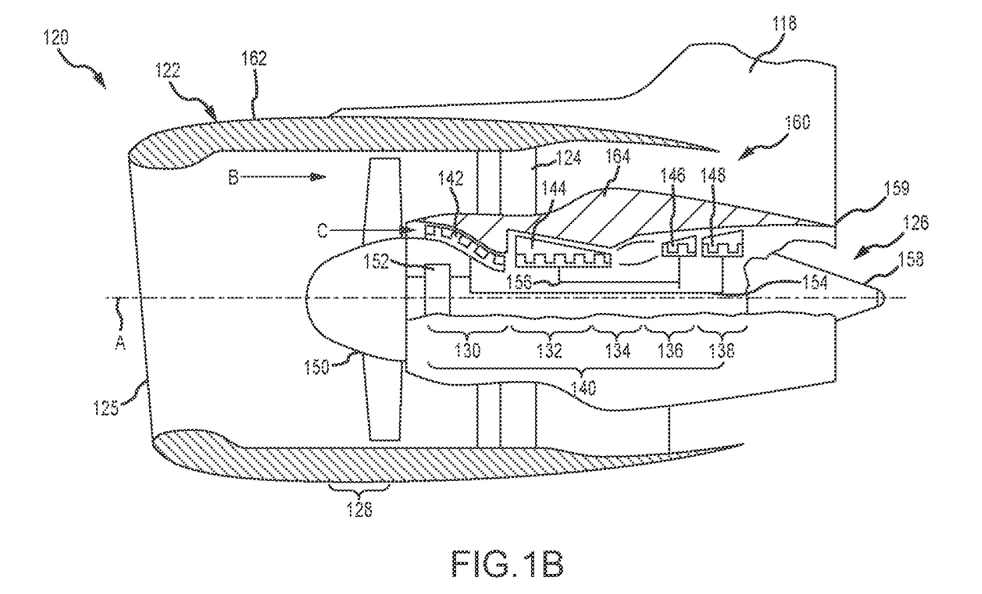
FIG. 1B is a side cutaway illustration of a propulsion system for the aircraft illustrated in FIG. 1A, in accordance with various embodiments.

Referring now to FIG. 1B, a side cutaway illustration of a gas turbine engine system 120, such as, for example, either of the starboard engine system 108 or the port engine system 110, is provided. The gas turbine engine system 120 includes the pylon 118 and a gas turbine engine 122 (e.g., a propulsion system) such as, for example, a geared turbofan engine that uses an outlet guide vane 124 (OGV) (or a plurality of outlet guide vanes) to structurally connect a fan module to a core engine module as well as redirect the incoming fan flow to the outlet guide vane 124. The gas turbine engine 122 is mounted to the pylon 118, which may be mounted to or otherwise configured with an aircraft airframe. Examples of an aircraft airframe include, but are not limited to, an aircraft wing (e.g., the starboard wing 102 or the port wing 104) or an aircraft fuselage (e.g., the fuselage 106).

The gas turbine engine 122 extends along an axial centerline A between an airflow inlet 125 and a core exhaust system 126. The gas turbine engine 122 includes a fan section 128, a low-pressure compressor section 130 (LPC), a high-pressure compressor section 132 (HPC), a combustor section 134, a high-pressure turbine section 136 (HPT) and a low-pressure turbine section (LPT) 138. The engine sections are typically arranged sequentially along the axial centerline A. The low-pressure compressor section 130 (LPC), the high-pressure compressor section 132 (HPC), the combustor section 134, the high-pressure turbine section 136 (HPT) and the low-pressure turbine section 138 (LPT) form a core 140 (or an engine core) of the gas turbine engine 122.

Each of the low-pressure compressor section 130 (LPC), the high-pressure compressor section 132 (HPC), the high-pressure turbine section 136 (HPT) and the low-pressure turbine section 138 (LPT) typically include a rotor having a plurality of rotor blades arranged circumferentially around and connected to one or more respective rotor disks—e.g., a low-pressure compressor rotor 142, a high-pressure compressor rotor 144, a high-pressure turbine rotor 146 and a low-pressure turbine rotor 148. A fan rotor 150 is connected to a gear train 152. The gear train 152 and the low-pressure compressor rotor 142 are connected to and driven by the low-pressure turbine rotor 148 through a low-speed shaft 154 (or a low-speed spool). The high-pressure compressor rotor 144 is connected to and driven by the high-pressure turbine rotor 146 through a high-speed shaft 156 (or a high-speed spool).

Air enters the gas turbine engine 122 through the airflow inlet 125 and is directed through the fan section 128 and into a core gas flow path C and a bypass gas flow path B. The air within the core gas flow path C may be referred to as "core air." The air within the bypass gas flow path B may be referred to as "bypass air." The core air is directed through the low-pressure compressor section 130, the high-pressure compressor section 132, the combustor section 134, the high-pressure turbine section 136 and the low-pressure turbine section 138 and exits the gas turbine engine 122 through the core exhaust system 126, which includes an exhaust center body 158 surrounded by an exhaust nozzle 159. Within the combustor section 134, fuel is injected into and mixed with the core air and ignited to provide a hot airstream that drives the turbine sections. The bypass air is directed through the bypass gas flow path B, and out of the gas turbine engine 122 through a bypass exhaust nozzle 160 to provide forward engine thrust. The bypass air may also or alternatively be directed through a thrust reverser to provide reverse engine thrust. A fan nacelle 162 is typically employed to surround the various sections of the gas turbine engine 122 and a core nacelle 164 is typically employed to surround the various sections of the core 140.

Figure 2:
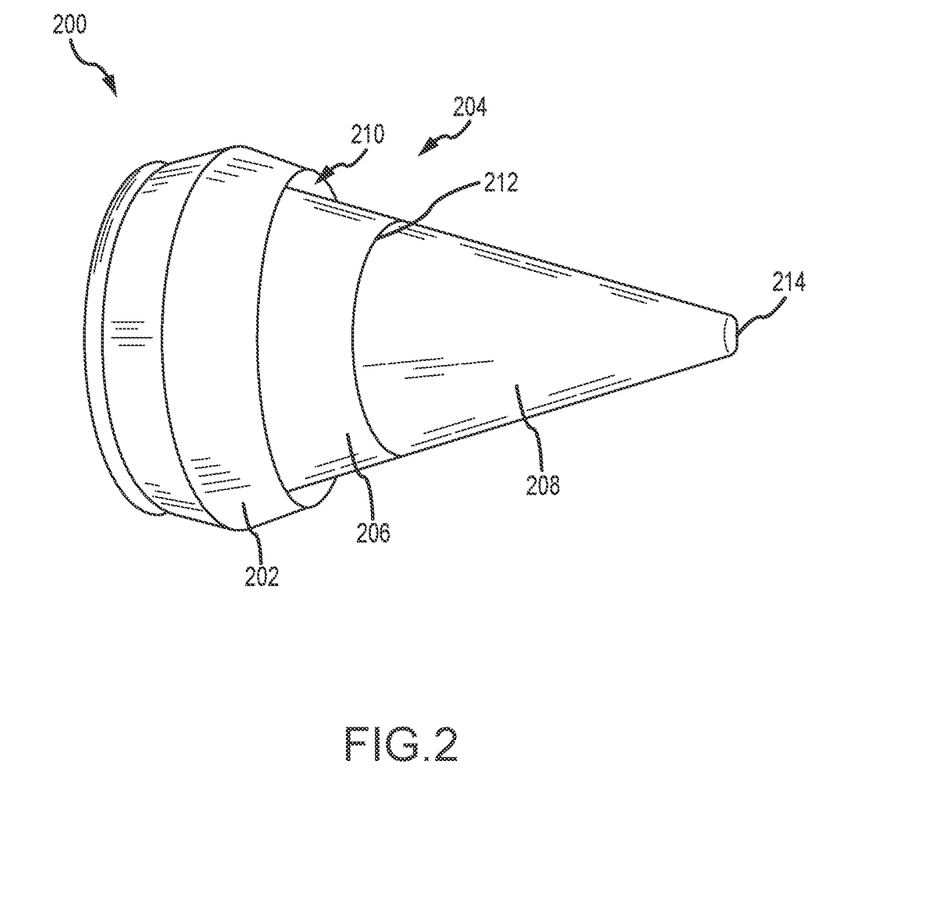
FIG. 2 is a perspective view of an exhaust portion of a gas turbine engine including an acoustically treated center plug, in accordance with various embodiments.

Referring now to FIG. 2, a schematic illustration of a core exhaust system 200, such as, for example, the core exhaust system 126 described above, is provided. In various embodiments, the core exhaust system 200 includes an exhaust nozzle 202 and a center body 204, similar to the exhaust nozzle 159 and the exhaust center body 158 described above. The center body 204 may be formed in two sections, including, for example, a center plug 206 and an aft cone 208. The exhaust nozzle 202 and the center plug 206 cooperate to form an annulus 210 through which exhaust gasses from a combustor section exit the core exhaust system 200. In various embodiments, the center plug 206 and the aft cone 208 are connected along a circumferential seam 212 at an aft end of the center plug 206. In the illustrated embodiment, the aft portion of the center plug 206 and the aft cone 208 extend aft from an aft end of the exhaust nozzle 202. The radially outer surfaces of the center plug 206 and the aft cone 208 combine to form a flow control surface that substantially prevents recirculation of the exiting exhaust gasses and facilitates convergence of the exhaust gasses as they exit the annulus 210. The center plug 206 forms a transition between an aft end of a turbine rotor (not shown) located just inside the core exhaust system 200 and the aft cone 208. In various embodiments, the center plug 206 and the aft cone 208 may have hollow center portions that permit cooling air to pass from an intake 214 at an aft tip of the aft cone 208 to internal portions of the engine or to house instrumentation, wiring, or the like.

Figure 3A:
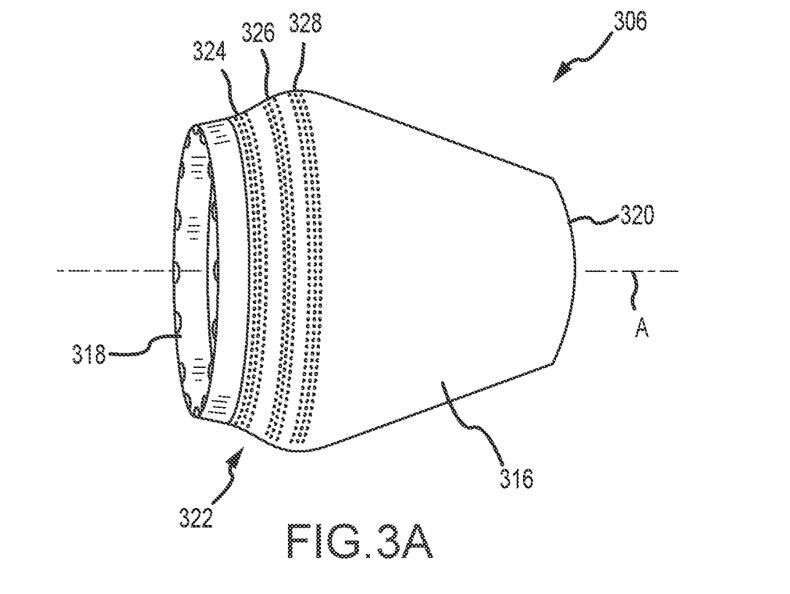
FIG. 3A is a perspective view of the forward section of a center plug, in accordance with various embodiments.
Figure 3B:
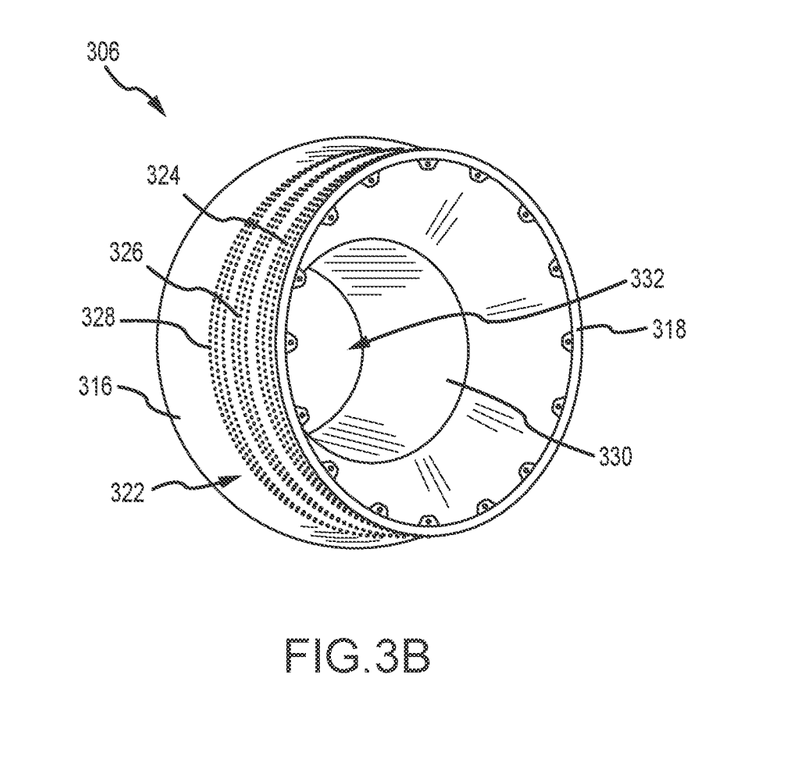
FIG. 3B is a perspective view of the center plug of FIG. 3A showing the forward end of the center plug, in accordance with various embodiments.

Referring now to FIGS. 3A and 3B, schematic illustrations of a center plug 306, similar to the center plug 206 described above, are provided. In various embodiments, the center plug 306 includes an outer skin 316 having an aerodynamic outer contour. The outer skin 316 is seamlessly constructed such that the center plug 306 has a substantially smooth outer surface. The center plug 306 may have a forward flange 318 configured for attachment to a casing proximate an aft end of a turbine rotor and an aft flange 320 configured for attachment to an aft cone, such as, for example, the aft cone 208 described above. As illustrated, the outer skin 316 may include an acoustically permeable portion 322 located on a forward portion of the outer skin 316 and extending around substantially the entire circumference of the forward portion of the outer skin 316. In various embodiments, the acoustically permeable portion 322 is formed via one or more pluralities of perforations, such as, for example, a first plurality of perforations 324, a second plurality of perforations 326 and a third plurality of perforations 328, each of which extends through the outer skin 316 and into an interior portion of the center plug 306 that is bounded by the outer skin 316 and an inner skin 330, the latter of which has a substantially cylindrical shape, is centered along a central longitudinal axis A of the center plug 306 and forms a substantially open center portion 332 of the center plug 306.

Figure 4:
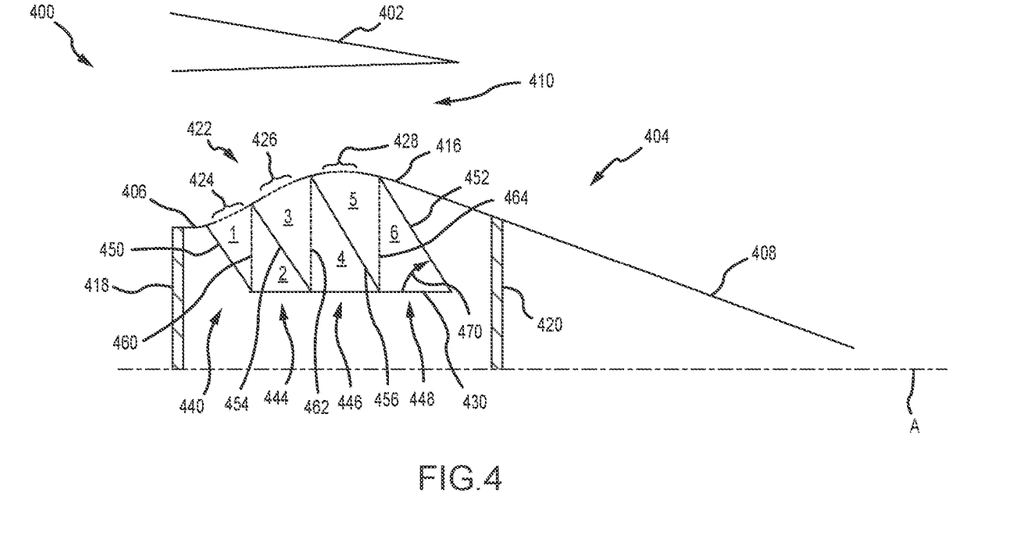
FIG. 4 is a cross sectional schematic view of a core exhaust system, in accordance with various embodiments.

Referring now to FIG. 4, a cross sectional schematic illustration of a core exhaust system 400, such as, for example, the core exhaust system 200 described above, is provided. In various embodiments, the core exhaust system 400 includes an exhaust nozzle 402 and a center body 404, similar to the exhaust nozzle 202 and the center body 204 described above. The center body 404 may be formed in two sections, including, for example, a center plug 406 and an aft cone 408, similar to those described above. The exhaust nozzle 402 and the center plug 406 cooperate to form an annulus 410 through which exhaust gasses from a combustor section exit the core exhaust system 400. Similar to the description provided above with reference to FIGS. 3A-3B, the center plug 406 includes an outer skin 416 having an aerodynamic outer contour. The center plug 406 may have a forward flange 418 configured for attachment to a casing proximate an aft end of a turbine rotor and an aft flange 420 configured for attachment to the aft cone 408. As illustrated, the outer skin 416 may include an acoustically permeable portion 422 located on a forward portion of the outer skin 416 and extending around substantially the entire circumference of the forward portion of the outer skin 416. The acoustically permeable portion 422 may be formed by one or more pluralities of perforations, such as, for example, a first plurality of perforations 424, a second plurality of perforations 426 and a third plurality of perforations 428 that extend through the outer skin 416, with the first plurality of perforations 424 disposed forward of the second plurality of perforations 426 and the second plurality of perforations 426 being disposed forward of the third plurality of perforations 428. As illustrated, each of the first plurality of perforations 424, the second plurality of perforations 426 and the third plurality of perforations 428 typically extend in a circumferential pattern about the outer skin 416.

As illustrated, the acoustically permeable portion 422 may coincide with one or more resonator cavities 440, such as, for example, a first resonator cavity 444, a second resonator cavity 446 and a third resonator cavity 448. The one or more resonator cavities is typically contained within a volume or space bounded by the outer skin 416, an inner skin 430, a forward bulkhead 450 and an aft bulkhead 452, with the volume or space extending circumferentially between the outer skin 416 and the inner skin 430 and axially between the forward bulkhead 450 and the aft bulkhead 452 to form a generally annular volume or space. In various embodiments, for example, the first resonator cavity 444 is formed by the volume or space bounded by the outer skin 416 and the inner skin 430 and the forward bulkhead 450 and a first intermediate bulkhead 454. In similar fashion, the second resonator cavity 446 is formed by the volume or space bounded by the outer skin 416 and the inner skin 430 and the first intermediate bulkhead 454 and a second intermediate bulkhead 456, and the third resonator cavity 448 is formed by the volume or space bounded by the outer skin 416 and the inner skin 430 and the second intermediate bulkhead 456 and the aft bulkhead 452.

Still referring to FIG. 4, each of the first resonator cavity 444, the second resonator cavity 446 and the third resonator cavity 448 is configured to exhibit acoustic attenuation properties of a Helmholtz resonator having a double degree of freedom (DDOF) type design. For example, the first resonator cavity 444 is divided into two sub-cavities (e.g., a first sub-cavity 1 and a second sub-cavity 2) via a first perforated disk 460 disposed between the forward bulkhead 450 and the first intermediate bulkhead 454 and extending between the outer skin 416 and the inner skin 430. Similarly, the second resonator cavity 446 is divided into two sub-cavities (e.g., a third sub-cavity 3 and a fourth sub-cavity 4) via a second perforated disk 462 disposed between the first intermediate bulkhead 454 and the second intermediate bulkhead 456 and extending between the outer skin 416 and the inner skin 430, and the third resonator cavity 448 is divided into two sub-cavities (e.g., a fifth sub-cavity 5 and a sixth sub-cavity 6) via a third perforated disk 464 disposed between the second intermediate bulkhead 456 and extending between the outer skin 416 and the inner skin 430. Note that in various embodiments, one or more of the forward bulkhead 450, the first intermediate bulkhead 454, the second intermediate bulkhead 456 and the aft bulkhead 452 may be oriented at an angle 470 with respect to a central longitudinal axis A of the center plug 406 such that a cone-like structure is formed, with the angle 470 being in a first range from about forty degrees (40°) to about eighty degrees (80°), or from about fifty degrees (50°) to about seventy degrees (70°) or being on the order of about sixty degrees (60°). Similarly, in various embodiments, one or more of the first perforated disk 460, the second perforated disk 462 and the third perforated disk 464 may be oriented in a substantially radial direction, as illustrated in FIG. 4, with respect to the central longitudinal axis A, or within a second range from about minus ten degrees (−10°) to about plus ten degrees (10°) from the radial direction with respect to the central longitudinal axis A.

During operation, an exhaust stream transits and exits the annulus 410 formed by the exhaust nozzle 402 and the center plug 406. Non-attenuated acoustic waves from the exhaust stream enter the first plurality of perforations 424 and into the first resonator cavity 444 where attenuation occurs. The non-attenuated acoustic waves of the exhaust stream enter the first sub-cavity 1 and then the second sub-cavity 2 via the first perforated disk 460. The acoustic waves are then reflected off the non-perforated walls of the second sub-cavity 2, pass back through the first perforated disk 460 and into the first sub-cavity 1 and exit the first resonator cavity 444 via the first plurality of perforations 424 as attenuated acoustic waves. Similarly, non-attenuated acoustic waves from the exhaust stream enter the second plurality of perforations 426 and into the second resonator cavity 446 where attenuation occurs. The non-attenuated acoustic waves of the exhaust stream enter the third sub-cavity 3 and then the fourth sub-cavity 4 via the second perforated disk 462. The acoustic waves are then reflected off the non-perforated walls of the fourth sub-cavity 4, pass back through the second perforated disk 462 and into the third sub-cavity 3 and exit the second resonator cavity 446 via the second plurality of perforations 426 as attenuated acoustic waves. And finally, non-attenuated acoustic waves from the exhaust stream enter the third plurality of perforations 428 and into the third resonator cavity 448 where attenuation occurs. The non-attenuated acoustic waves of the exhaust stream enter the fifth sub-cavity 5 and then the sixth sub-cavity 6 via the third perforated disk 464. The acoustic waves are then reflected off the non-perforated walls of the sixth sub-cavity 6, pass back through the third perforated disk 464 and into the fifth sub-cavity 5 and exit the third resonator cavity 448 via the third plurality of perforations 428 as attenuated acoustic waves.

Benefits of the noise attenuation structures described above include the ability to attenuate low-frequency noise (e.g., on the order of 200 Hz to 1,000 Hz) via DDOF cavities that would otherwise be too large to incorporate into a center plug in the form of single degree of freedom (SDOF) resonator cavities. Further, the shape of the perforated and non-perforated walls of the disclosed DDOF resonator cavities (e.g., the cone-shaped non-perforated walls and the disk-shaped perforated walls) enable relative ease of manufacture when compared to the more typical honeycomb-shaped resonator cavities. The shape of the perforated and non-perforated walls also enable the resulting resonator cavities to fit against the compound curvature often exhibited by the outer skin of the center body by attaching the radially outboard edges of a series of perforated sheet metal disks and non-perforated sheet metal cones to the radially inside surface of the forward portion of the center body and the radially inboard edges of the same structures to the radially outside surface of the inner skin of the center body.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A center plug for attenuating noise in a gas turbine engine, comprising:
   an inner skin, the inner skin having a substantially cylindrical shape and extending along an axial centerline;
   an outer skin positioned radially outside the inner skin;
   a forward bulkhead disposed proximate a forward end of the inner skin, the forward bulkhead connected to and extending radially outward and forward from the inner skin to the outer skin, the forward bulkhead oriented at an angle with respect to the axial centerline thereby forming a first cone-like structure extending radially aft;
   an aft bulkhead disposed proximate an aft end of the inner skin, the aft bulkhead connected to and extending radially outward and forward from the inner skin to the outer skin, the aft bulkhead oriented at the angle with respect to the axial centerline and parallel to the forward bulkhead thereby forming a second cone-like structure extending radially aft;
   a first resonator cavity disposed within a volume defined by the inner skin, the outer skin, the forward bulkhead, and the aft bulkhead, the first resonator cavity including a first perforated disk extending between the inner skin and the outer skin and forming a first sub-cavity and a second sub-cavity; and
   a first intermediate bulkhead disposed aft of the first perforated disk and extending radially outward and forward from the inner skin and the outer skin, the first intermediate bulkhead oriented at the angle with respect to the axial centerline and parallel to the forward bulkhead and the aft bulkhead thereby forming a third cone-like structure extending radially aft.

2. The center plug of claim 1, wherein the outer skin is connected to and positioned radially outward of the forward bulkhead, the aft bulkhead and the first perforated disk.

3. The center plug of claim 2, wherein the outer skin includes a first plurality of perforations extending into the first sub-cavity.

4. The center plug of claim 3, wherein the angle is within a first range from about forty degrees to about eighty degrees with respect to the axial centerline.

5. The center plug of claim 4, wherein the first perforated disk is oriented within a second range from about minus ten degrees to about plus ten degrees with respect to a radial direction extending perpendicular to the axial centerline.

6. The center plug of claim 5, wherein the first perforated disk extends perpendicularly to the axial centerline.

7. The center plug of claim 5, wherein the first resonator cavity is configured to attenuate noise having frequencies within a range extending from about 200 Hz to about 1,000 Hz.

8. The center plug of claim 5, further comprising a second resonator cavity disposed within the volume defined by the inner skin, the outer skin, the forward bulkhead, and the aft bulkhead, the second resonator cavity including a second perforated disk extending between the inner skin and the outer skin and forming a third sub-cavity and a fourth sub-cavity.

9. The center plug of claim 8, further comprising a second intermediate bulkhead disposed aft of the second perforated disk and extending radially outward and forward from the inner skin and the outer skin.

10. The center plug of claim 9, wherein the second intermediate bulkhead is oriented at the angle with respect to the axial centerline and parallel to the forward bulkhead, the first intermediate bulkhead, and the aft bulkhead thereby forming a fourth cone-like structure extending radially aft.

11. The center plug of claim 10, wherein the second perforated disk is oriented within the second range from about minus ten degrees to about plus ten degrees with respect to the radial direction extending perpendicular to the axial centerline.

12. The center plug of claim 11, further comprising a third resonator cavity disposed within the volume defined by the inner skin, the outer skin, the forward bulkhead, and the aft bulkhead, the third resonator cavity including a third perforated disk extending between the inner skin and the outer skin and forming a fifth sub-cavity and a sixth sub-cavity.

13. The center plug of claim 12, wherein the second resonator cavity is bounded by the first intermediate bulkhead and the second intermediate bulkhead and the third resonator cavity is bounded by the second intermediate bulkhead and the aft bulkhead.

14. The center plug of claim 13, wherein the outer skin includes a second plurality of perforations extending into the third sub-cavity and a third plurality of perforations extending into the fifth sub-cavity.

15. A noise attenuation system for a gas turbine engine, comprising:
a center plug, the center plug including an inner skin, the inner skin having a substantially cylindrical shape and extending along an axial centerline, an outer skin positioned radially outside the inner skin, a forward bulkhead disposed proximate a forward end of the inner skin, the forward bulkhead connected to and extending radially outward and forward from the inner skin to the outer skin, the forward bulkhead oriented at an angle with respect to the axial centerline thereby forming a first cone-like structure extending radially aft, an aft bulkhead disposed proximate an aft end of the inner skin, the aft bulkhead connected to and extending radially outward and forward from the inner skin to the outer skin, the aft bulkhead oriented at the angle with respect to the axial centerline and parallel to the forward bulkhead thereby forming a second cone-like structure extending radially aft;
a first resonator cavity disposed within a volume defined by the inner skin, the outer skin and the forward bulkhead and the aft bulkhead, the first resonator cavity including a first perforated disk extending between the inner skin and the outer skin and forming a first sub-cavity and a second sub-cavity, the first perforated disk extending perpendicularly to the axial centerline extending through the center plug; and
a first intermediate bulkhead disposed aft of the first perforated disk and extending radially outward and forward from the inner skin and the outer skin, the first intermediate bulkhead oriented at the angle with respect to the axial centerline and parallel to the forward bulkhead and the aft bulkhead thereby forming a third cone-like structure extending radially aft.

16. The noise attenuation system of claim 15, further comprising a second resonator cavity disposed within the volume defined by the inner skin, the outer skin and the forward bulkhead and the aft bulkhead, the second resonator cavity including a second perforated disk extending between the inner skin and the outer skin and forming a third sub-cavity and a fourth sub-cavity, the second perforated disk extending perpendicularly to the axial centerline extending through the center plug.

17. The noise attenuation system of claim 16, wherein the first resonator cavity and the second resonator cavity are separated by the first intermediate bulkhead and wherein the angle is within a range from about forty degrees to about eighty degrees with respect to the axial centerline.

* * * * *